United States Patent [19]

Freudeberg et al.

[11] 4,041,482
[45] Aug. 9, 1977

[54] CHARACTER GENERATOR FOR THE REPRODUCTION OF CHARACTERS

[75] Inventors: Jurgen Freudeberg; Reimer Von Osten, both of Eiserfeld, Germany

[73] Assignee: U.S. Philips Corporation, New York, N.Y.

[21] Appl. No.: 665,955

[22] Filed: Mar. 11, 1976

[30] Foreign Application Priority Data

Mar. 25, 1975 Germany .............................. 2513059

[51] Int. Cl.² .............................................. G06F 3/14
[52] U.S. Cl. ................................ 340/324 AD; 178/30; 340/336
[58] Field of Search ............ 340/324 AD, 336, 324 R, 340/324 A; 178/15, 30

[56] References Cited

U.S. PATENT DOCUMENTS

| 3,444,319 | 5/1969 | Artzt et al. ............................ 178/30 |
| 3,668,687 | 6/1972 | Hale ............................... 340/324 AD |
| 3,675,232 | 7/1972 | Strout ........................... 340/324 AD |
| 3,735,383 | 5/1973 | Naka ............................... 340/324 AD |
| 3,735,388 | 5/1973 | Naka ............................... 340/324 AD |
| 3,803,583 | 4/1974 | Manber ......................... 340/324 AD |

Primary Examiner—Marshall M. Curtis
Attorney, Agent, or Firm—Frank R. Trifari; Steven R. Biren

[57] ABSTRACT

In an apparatus which supplies characters or symbols and which is intended for service in different countries, some characters or symbols must have different forms for different countries or groups of countries. In the case of read-out apparatus which reproduces in dots, such as matrix printers or displays, the character forms are usually stored in a read-only store, a given address being assigned to each character. In order to achieve simple addressing in the case of a character which has different forms in different countries, not the character form is stored in the corresponding storage location, but rather one or more addresses which indicate in which location in the character store the relevant, country-dependent character form is present. To this end, each storage location comprises an additional storage (bit) position which indicates whether or not address information is concerned and which is read and interrogated first. Depending on the contents of this storage position, either the remainder of the store is then read and transferred to the read-out or an address in the address control system is read and transferred; after that the special character form stored at this further address location is read.

5 Claims, 2 Drawing Figures

CHARACTER GENERATOR FOR THE REPRODUCTION OF CHARACTERS

The invention relates to a character generator for generating the signals for a reproduction device for the reproduction of characters composed of a dot matrix, comprising a store which is addressed by an address control system and which contains in each addressed storage location at least a part of the information for generating the signals for a character assigned to this address.

Reproduction devices of this kind are, for example, mosaic printers and image display screen apparatus. In the case of mosaic printers, a series of recording needles preferably print a character column-wise in succession, so that at any given instant only the signals for a given column of this character are required. An image display screen apparatus, however, composes one or more characters from consecutive lines, so that each time only the information for a given line of the character or characters to be displayed is required. For generating these signals use is generally made of read-only stores, the addressing of a given storage location therein giving access either to the desired part of the character to be displayed at this instant or to the complete character information, the desired parts thereof then being selected by way of additional selection lines.

These read-only stores can be manufactured comparatively cheaply in integrated form when a large number of stores contain the same information pattern, because the photo-mask for the desired information pattern mainly represents a non-recurrent, high manufacturing cost, while the remainder of the manufcturing process is substantially independent of the desired information pattern. In the case of character generators for machines intended for different countries, however, a problem occurs in that in different countries different characters are required to some extent, for example, the currency symbols or the special national characters. The special characters may concern special representations of one character identity, for example, a "seven" with or without a stroke. There may also be characters which have no direct equivalent in an other language. Even mathematical or other characters which are or which are not required in dependence of the application may be concerned. For each country or even for given applications different character generators would then be required; the quantity of each type of generator would then be small, so that each generator would be expensive.

The invention has for its object to provide a character generator comprising a read-only store which contains the information for a large number of different character forms and which still enables simple addressing. This object is achieved in that for any desired character form the store comprises a storage location containing the associated complete character information, the storage location assigned to a character, which can be reproduced in different forms containing address information, each storage location including, moreover, at lest one storage (bit) position for control information which indicates whether or not the said storage location contains address information, any access to a storage location in principle causing this storage (bit) position to be read first, the control information thus read out controlling a switch which subsequently applies the address information read out from the storage location to the address control system, thus initiating the reading of the information of a character to be reproduced and present at this next address indicated by the address information read out in the first instance. Thus, the read-only store not only contains character information, but also address information, in given storage locations whereto characters having a number of variations or whereto a plurality of character identities have been assigned, the latter being present in at least two different address locations. The selection from the different addresses can be arbitrary. In the case of a read-only store where only a part of character information present in a storage location is selected by additional selection signals, it is advantageous to arrange the addresses in the storage locations containing address information so that each time a complete address is selected by means of the additional selection signals, a character part of a storage location containing character information corresponding to a complete address of a storage location containing address information. The storage locations addressed by the stored address information are preferably contained in a given sector of the store. Notably in this case it will not be necessary for the stored address information to indicate the complete address, since the address to be activated is co-determined by additional adjustable information signals. These additional information signals are then selected so that only addresses in the given sector of the store are selected.

An embodiment in accordance with the invention will be described in detail hereinafter with reference to the drawing.

Figure 1:
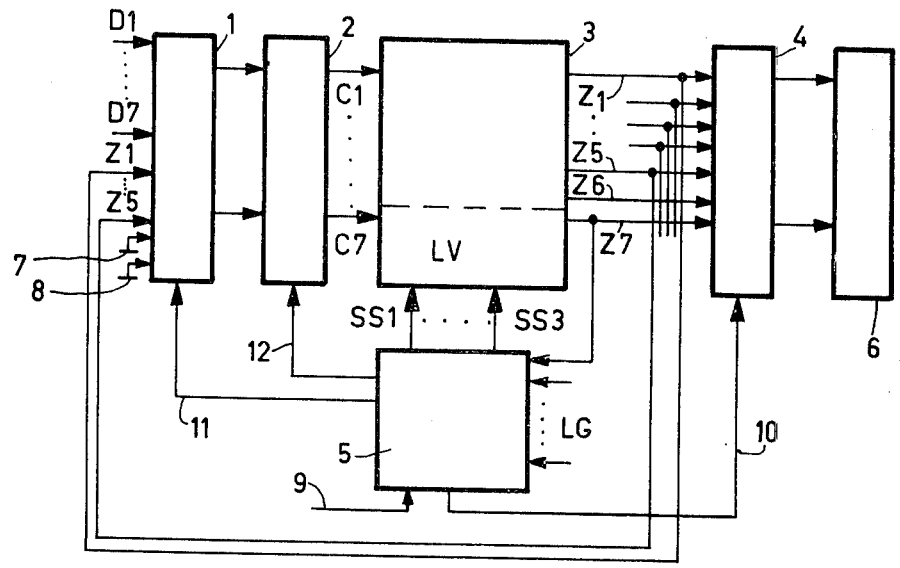
FIG. 1 shows a block diagram of the character generator.

The lines $D1 \ldots 7$ in FIG. 1 are connected, for example, to outputs of a keyboard or to an information output line of a computer. The signals on the lines $D1 \ldots 7$, representing the addresses in the character store, are applied to a switch 1 which may initially be in the first position, the address signals on the lines $D1 \ldots 7$ then being applied to and stored in the register 2. The switch 1 is preferably constructed as an electronic switch and comprises, for example, an AND-gate for each input line $D1 \ldots 7$, $Z1 \ldots 5, 7, 8$, the two groups of AND-gates, associated with the first group of input lines $D1 \ldots 7$ and the second group of input lines $Z1 \ldots 5, 7, 8$, respectively, being opened by the control system 5 in a complementary fashion relative to each other. The inputs 7 and 8 carry a fixed signal.

Each address, that is to say any combination of signals on the lines $D1 \ldots 7$, is each time assigned to a character identity (code) to be reproduced, regardless of the fact whether or not this character identity has different forms in different countries, i.e. regardless of the variations per country.

The addresses then stored in the register 2 are applied, via the lines $C1 \ldots 7$, to the character store 3 which may be, for example, an integrated read-only store. Because the seven address lines $C1 \ldots 7$ transfer the addresses in coded form, at the most 128 addresses can thus be selected. The signals on the input lines $D1 \ldots 7$, however, select only a part of the actual addresses assigned to the character base. The other addresses can be occupied by the national variations and can be activated by the addresses stored in the character store 3.

When address signals are applied via the lines C1 . . . 7, each time a storage location in the character store 3 is selected.

Figure 2:
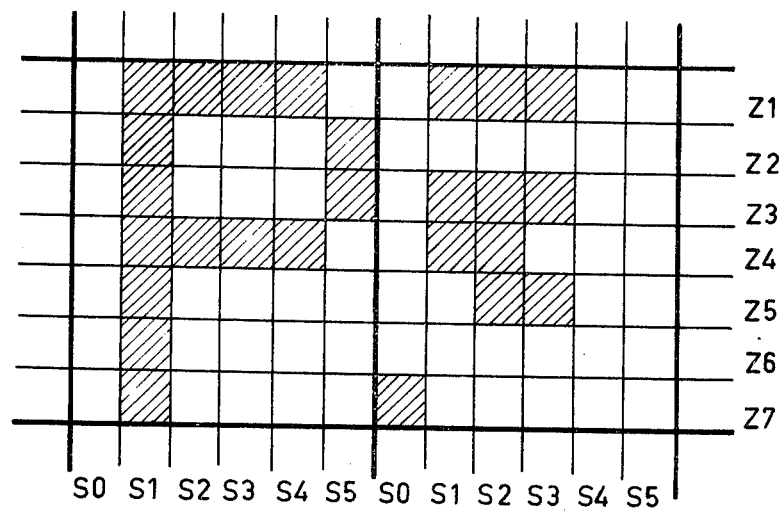
FIG. 2 shows the lay-out of the information in two different storage locations.

FIG. 2 shows the lay-out and the information pattern of two storage locations, the left storage location containing the information for reproducing the capital letter P, whilst the right storage location contains address information. The actual geometrical arrangement of the storage bits in the store may also be different, however, without their effect being changed thereby.

In the present example each storage location has a capacity of 42 bits which are shown to be arranged in rows Z1 . . . 7 and columns S0 . . . 5. When a storage location is selected, moreover, one of the columns S0 . . . 5 must be selected for parallel delivery of the information present in this column on the row lines Z1 . . . 7 of FIG. 1. The column is selected by signals on the column control lines SS1 . . . SS3 from the control system 5 which indicate the column in coded form. As a result, at the most eight columns can be selected.

After or during the addressing of a storage location in the character store 3, the control system 5 receives a signal via the line 9, with the result that the column S0 is selected; subsequently, it is determined whether a signal appears on the row line Z7 connected to the control system, for example, a logic "1". FIG. 2 shows that in the left storage location, containing character information, no bit is stored in the column S0. This is also applicable to all other storage locations which contain characters without national variations. When one of these storage locations is selected, no signal appears on the line Z7 and, consequently, the control system is allowed to successively select the next five columns S1 . . . S5, for example, in that a counter (not shown) counts five positions further. Simultaneously, a signal on the line 10 opens the AND-gates 4 separately included in each of the two lines Z1 . . . Z7, so that the information of the individual columns is successively applied to the reproduction device 6, it being assumed that this case concerns a mosaic printer which prints column-wise by means of a series of recording pins.

The right storage location in FIG. 2, containing address information, shows that a bit is stored at the intersection of the column S0 and the row Z7. This is also the case for all other storage locations whose address is assigned to a character having national variations and which thus contain address information instead of character information. When such a storage location is addressed and the column S0 is selected by the control system 5, a signal appears on the line Z7. This signal causes the control system 5 to block or prevent the opening of the AND-gates 4 and to select instead a single one of the columns S1 . . . 5. The selection of the particular column is dependent on the signals on the inputs LG which indicate the group of countries (or country) for which the machine is intended and where given character forms are desired. These signals can be generated, for example, as a "1-out-of-5" code by jumpers carrying constant signal voltages.

As soon as the control system 5 has selected the relevant column, the column output 11 supplies a signal which switches over the switch 1, so that the signals present on the lines Z1 . . . 5 and appearing on the output of the character store 3 as well as the signals of the inputs 7 and 8 which are permanently at zero potential are applied to the register 2 in which they are stored under the control of a signal on the line 12. The register 2 then contains a different address which activates a storage location which contains the character originally selected on the lines D1 . . . 7 in a form desired for the group of countries in accordance with the signals on the lines LG. The control system 5 then successively selects the columns S1 . . . 5 and simultaneously opens the AND-gates 4 blocked thus far, so that the character information can reach the reproduction device 6. In the example in accordance with FIG. 2, only the columns S1 . . . 3 of the right-hand storage location are occupied by addresses, so that only three different groups of countries are represented. After the writing of the new address in the register 2, the column S0 need not be selected again, because after the previous process it is already certain that a storage location containing character information has been selected. However, if with respect to at least one character there are more different groups of countries than there are usable columns of a storage location, i.e. more than five groups of countries in the described example, it may be advantageous to store further address information in the storage location corresponding to the new address. In this case the control system 5 can first select the column S0 for each new address and, as long as a bit is stored in an addressed storage location at the intersection of the column S0 and the row Z7, the reading and writing of an address in the register 2 is repeated until a storage location is addressed which has not stored a bit in the column S0.

FIG. 1 shows that only the row lines Z1 . . . 5 are connected to the switch, whilst the lower two inputs of this group are permanently connected to zero potential. As a result, the stored addresses actuate storage locations only in a given sector of the character store 3; this sector is diagrammatically denoted in the FIG. 1 by the reference LV and occupies about a quarter of the complete store in the example shown. The same result would be obtained if in principle no bit were stored in the rows 6 and 7 of the storage locations containing address information (except for the column S0) and all row lines Z1 . . . Z7 were connected to the switch.

However, it is not necessary for the storage locations indicated by the stored addresses to be collected in a given sector of the character store 3; they can alternatively be distributed across the entire character store (for example, each time situated adjacent the storage location containing the addresses). Obviously, in this case all bits must be stored in the storage locations containing address information, and all row lines Z1 . . . 7 must be connected to the switch 1.

What is claimed is:

1. A character generator for generating the signals for a reproduction device for the reproduction of characters composed of a matrix of dots, comprising a store which is addressed by an address control system and which contains in each addressed storage location at least a part of the information for generating the signals for a character assigned to this address, characterized in that for any desired character form the store (3) comprises a storage location containing the associated complete character information, and a storage location assigned to a character which can be reproduced in respective different forms containing address information, each storage location further including at least one storage position for control information which indicates whether the storage location contains address information or character information, any access to a storage location causing this storage position to be read first, the control information read out controlling a switch (1) which subsequently applies the address information read from the storage location to the address control system (2), thus initiating the reading of the information of a character to be reproduced and present at this address which corresponds to the address information.

2. A character generator as claimed in claim 1, in which each time only an information of a character part is read from an addressed storage location by additional selection signals, characterized in that a complete information of a character part of a storage location containing character information has similar structure as a complete address of a storage location containing address information.

3. A character generator as claimed in claim 1, characterized in that the storage locations addressed by the stored address information are situated in a given sector of the store (3).

4. A character generator as claimed in claim 1, characterized in that the address to be activated is determined by the address information as well as by additional information signals.

5. A character generator for generating the signals for a reproduction device for the reproduction thereby of a first plurality of characters each composed of a matrix of dots, comprising an input for receiving a primary address, a store having store addressing means connected to said input and operative for addressing a storage location within said store, said store comprising a first plurality of storage locations and a second plurality of storage locations which is larger than said first plurality, each of said second plurality of storage locations containing first storage positions for storing a complete character information and at least one second storage position for storing control information, said store further comprising at least one further storage location assigned to a character which can be reproduced in respective different forms, said at least one further storage location containing first storage positions for storing secondary address information and at least one second storage position for storing control information, said control information being adapted for indicating whether said storage location contains character information or address information, said store addressing means being adapted for reading upon reception of an address, first the second storage position within the storage location thus addressed, whereby said control information in the case of said further storage location being addressed is then operative for controlling a switch for retrocoupling secondary address information read out from said further storage location back to an input of said store addressing means, for addressing one of said second plurality of storage locations, whereby the total complement of primary addresses is thus adapted for each separately addressing a like number of said second plurality of storage locations.

* * * * *